United States Patent
Okazaki et al.

(10) Patent No.: US 9,908,713 B2
(45) Date of Patent: Mar. 6, 2018

(54) VERTICAL CIRCULATING CONVEYOR

(71) Applicants: NAKANISHI METAL WORKS CO., LTD., Osaka-shi (JP); TOYOTA BOSHOKU KABUSHIKI KAISHA, Kariya-shi (JP)

(72) Inventors: Yoshihiro Okazaki, Osaka (JP); Haruyuki Yamaguchi, Osaka (JP); Tomonari Shibayama, Osaka (JP); Yuji Sekino, Osaka (JP); Tomohiro Yamakawa, Kariya (JP); Toshihiro Naruse, Kariya (JP); Ken Shiojima, Kariya (JP)

(73) Assignees: NAKANISHI METAL WORKS CO., LTD., Osaka-shi (JP); TOYOTA BOSHOKU KABUSHIKI KAISHA, Kariya-shi (JP)

( * ) Notice: Subject to any disclaimer, the term of this patent is extended or adjusted under 35 U.S.C. 154(b) by 0 days.

(21) Appl. No.: 15/126,419

(22) PCT Filed: Mar. 25, 2015

(86) PCT No.: PCT/JP2015/059054
§ 371 (c)(1),
(2) Date: Sep. 15, 2016

(87) PCT Pub. No.: WO2015/147033
PCT Pub. Date: Oct. 1, 2015

(65) Prior Publication Data
US 2017/0081128 A1    Mar. 23, 2017

(30) Foreign Application Priority Data

Mar. 26, 2014 (JP) ................................ 2014-063334
Mar. 24, 2015 (JP) ................................ 2015-060700

(51) Int. Cl.
*B65G 21/22* (2006.01)
*B65G 47/56* (2006.01)
(Continued)

(52) U.S. Cl.
CPC ............. *B65G 35/06* (2013.01); *B65G 21/22* (2013.01)

(58) Field of Classification Search
None
See application file for complete search history.

(56) References Cited

U.S. PATENT DOCUMENTS 5,922,230 A * 7/1999 Yokota .................. B23K 1/008
198/465.3

FOREIGN PATENT DOCUMENTS

GB    1 371 059    10/1974
JP    S42-14214    8/1967
(Continued)

OTHER PUBLICATIONS

International Search Report for International Application No. PCT/JP2015/059054 dated May 19, 2015.

*Primary Examiner* — Kavel Singh
(74) *Attorney, Agent, or Firm* — Kratz, Quintos & Hanson, LLP

(57) ABSTRACT

A vertical circulating conveyor includes a lowering path part (3) and a raising path part (4) that connect end portions of a conveyance path part (1) and a return path part (2) vertically positioned in a linear arrangement. The lowering path part (3) includes front wheel lowering guide rails (8A) to guide front wheels (F) of a transport vehicle (5) and rear wheel lowering guide rails (8B) to guide rear wheels (R) of the transport vehicle (5). The transport vehicle (5) is moved in the lowering path part (3) by falling under its own weight in almost the horizontal state in a powerless manner while (Continued)

the front wheels (F) of the transport vehicle (5) are guided by the front wheel lowering guide rails (8A) and the rear wheels (R) of the transport vehicle (5) are guided by the rear wheel lowering guide rails (8B).

12 Claims, 13 Drawing Sheets

(51) Int. Cl.
*B65G 47/00* (2006.01)
*B65G 47/52* (2006.01)
*B65G 47/64* (2006.01)
*B65G 35/06* (2006.01)

(56) References Cited

FOREIGN PATENT DOCUMENTS

| | | |
|---|---|---|
| JP | S45-13613 | 5/1970 |
| JP | S48-33589 | 10/1973 |
| JP | H02-20770 | 1/1990 |
| JP | H05-162839 | 6/1993 |
| JP | 2008-120468 A1 | 5/2008 |
| JP | 2011-126682 A1 | 6/2011 |

\* cited by examiner

VERTICAL CIRCULATING CONVEYOR

TECHNICAL FIELD

The present invention relates to a vertical circulating conveyor that circulates transport vehicles along a vertical circulating path.

BACKGROUND ART

As a vertical circulating conveyor that moves transport vehicles capable of loading articles along a vertical circulating path composed of a linear conveyance path part and a linear return path part positioned below the conveyance path part, a lowering path part that connects a downstream end portion of the conveyance path part and an upstream end portion of the return path part, and a raising path part that connects a downstream end portion of the return path part and an upstream end portion of the conveyance path part, and perform a work on the articles at the conveyance path part, there is a lift device that raises and lowers a table to move the transport vehicles at the lowering path part and the raising path part (hereinafter, called "table raising and lowering lift device") (for example, refer to Patent Document 1).

CITATION LIST

Patent Literature

Patent Document 1: JP-A No. H05-162839

SUMMARY OF THE INVENTION

Technical Problem

According to the configuration of the conventional conveyor as described in Patent Document 1, it is necessary to provide a feeding device that feeds the transport vehicles to the table raising and lowering lift device and a delivery device that delivers the transport vehicles from the table raising and lowering lift device at the lowering path part and the raising path part.

In addition, it is necessary to temporarily fast-forward the transport vehicle having exited the work line at the conveyance path part at a high speed to keep a sufficient distance from the following transport vehicle at the lowering path part so as not to be overtaken by the following transport vehicle, and complete the operation of feeding the transport vehicle to the table raising and lowering lift device, the operation of lowering the table raising and lowering lift device, the operation of delivering the transport vehicle from the table raising and lowering lift device, and the operation of raising the table raising and lowering lift device before the feeding of the following transport vehicle to the table raising and lowering lift device. This requires setting a long high-speed fast-forward section.

Further, when the transport vehicles are moved in the lowering path part by the table raising and lowering lift device, the table in the raised position needs to be lowered to the lowered position and then returned to the raised position. This leads to a longer conveyance cycle time.

In light of the foregoing circumstances, an object of the present invention is to provide a vertical circulating conveyor that obviates the need for a feeding device, a delivering device, or the like at the lowering path part to reduce manufacturing costs and maintenance costs, contributes to energy saving and space saving, and shortens the conveyance cycle time.

Solution to Problem

To solve the foregoing problems, a conveyor according to the present invention is a vertical circulating conveyor that moves a transport vehicle capable of loading an article along a vertical circulating path composed of a linear conveyance path part and a linear return path part positioned below the conveyance path part, a lowering path part that connects a downstream end portion of the conveyance path part and an upstream end portion of the return path part, and a raising path part that connects a downstream end portion of the return path part and an upstream end portion of the conveyance path part, and has a work path part in the conveyance path part where a work is performed on the article, wherein the lowering path part includes lowering guide rails to guide running wheels of the transport vehicle, the transport vehicle is moved in the lowering path part by falling under its own weight in a powerless manner while the running wheels of the transport vehicle are guided by the lowering guide rails, and the vertical circulating conveyor has a section in which the transport vehicle having fallen under its own weight from the lowering path part coasts and moves in a powerless manner in the return path part (claim 1).

According to this configuration, the transport vehicle can be moved in the lowering path part under the weight of the transport vehicle in a powerless manner. This eliminates the need for a powered table raising and lowering lift device, a powered feeding device for feeding the transport vehicle to the table raising and lowering lift device, a powered delivering device for delivering the transport vehicle from the table raising and lowering lift device, unlike the case where the transport vehicle is moved in the lowering path part by the table raising and lowering lift device. This contributes to energy saving and space saving and reduces manufacturing costs and maintenance costs.

In addition, since the transport vehicle is not moved in the lowering path part by raising and lowering the table by the table raising and lowering lift device, it is not necessary to temporarily fast-forward the transport vehicle having exited the work line in the conveyance path part at a high speed to keep a sufficient distance from the following transport vehicle so as not to be overtaken by the following transport vehicle, and complete the operation of feeding the transport vehicle to the table raising and lowering lift device, the operation of lowering the table raising and lowering lift device, the operation of delivering the transport vehicle from the table raising and lowering lift device, and the operation of raising the table raising and lowering lift device before the feeding of the following transport vehicle to the table raising and lowering lift device, unlike the case where the transport vehicle is moved in the lowering path part by the table raising and lowering lift device. Accordingly, it is not necessary to provide a long high-speed fast-forward section unlike in the case of the table raising and lowering lift device, which contributes to space saving.

Further, unlike the case where the transport vehicle is moved in the lowering path part by the table raising and lowering lift device, it is not necessary to lower the table in the raised position to the lowered position and then return the same to the raised position. The transport vehicle can be continuously lowered, thereby shortening the conveyance cycle time.

Moreover, the vertical circulating conveyor has the section in which the transport vehicle having fallen from the lowering path part under its own weight coasts and moves in a powerless manner in the return path part. This makes it possible to decrease or eliminate the feeding devices for moving the transport vehicle having entered in the return path part to the downstream side of the return path part, thereby reducing manufacturing costs and maintenance costs.

It is preferred that, while the transport vehicle is moving in the conveyance path part, a distance between right-left outer sides of front wheels as front-side right and left running wheels and a distance between right-left outer sides of rear wheels as rear-side right and left running wheels are changed in a direction of the movement, the lowering guide rails are composed of right and left front wheel lowering guide rails in an arc shape in a right-left view to guide the front wheels and right and left rear wheel lowering guide rails in an arc shape in a right-left view to guide the rear wheels, and the transport vehicle is lowered in almost the horizontal state in the lowering path part while the front wheels are guided by the front wheel lowering guide rails and the rear wheels are guided by the rear wheel lowering guide rails (claim 2).

According to this configuration, the transport vehicle can be moved in the lowering path part in almost the horizontal position by the simple structure in which the distance between the right-left outer sides of the right and left front wheels and the distance between the right-left outer sides of the right and left rear wheels of the transport vehicle are changed, and the front wheels and the rear wheels are guided by the front wheel lowering guide rails and the rear wheel lowering guide rails, respectively. This reduces manufacturing costs and does not cause inclination of the transport vehicle at the lowering path part.

It is further preferred that, while the transport vehicle is moving in the conveyance path part, a distance between right-left outer sides of front wheels as front-side right and left running wheels and a distance between right-left outer sides of rear wheels as rear-side right and left running wheels are changed in a direction of the movement, the lowering guide rails are composed of right and left front wheel lowering guide rails to guide the front wheels and right and left rear wheel lowering guide rails to guide the rear wheels, a height-direction distance from the position of the running wheels in the conveyance path part to the position of the running wheels where a front-back movement direction is reversed in the lowering path part is made smaller than half of a height-direction distance from the position of the running wheels in the conveyance path part to the position of the running wheels in the return path part, and the transport vehicle is lowered in almost the horizontal state in the lowering path part while the front wheels are guided by the front wheel lowering guide rails and the rear wheels are guided by the rear wheel lowering guide rails (claim 3).

According to this configuration, the same advantageous effects as those of the invention according to claim 2 can be provided.

In addition, the height-direction distance from the position of the running wheels in the conveyance path part to the position of the running wheels where the front-back movement direction is reversed in the lowering path part is made smaller than half of the height-direction distance from the position of the running wheels in the conveyance path part to the position of the running wheels in the return path part, and therefore, while the transport vehicle is lowered by gravity along the front wheel lowering guide rails and the rear wheel lowering guide rails with clearance from the running wheels, when the front-back movement direction is reversed and the running wheels collide with the front wheel lowering guide rails and the rear wheel lowering guide rails, the speed of the collision is lower than that in the invention according to claim 2, thereby reducing the sound generated by the collision.

It is still further preferred that the transport vehicle is configured such that the distance between the right-left outer sides of the right and left rear wheels is smaller than the distance between the right-left outer sides of the right and left front wheels, the vertical circulating conveyor includes upper connection rails that extend between upper parts of the front wheel lowering guide rails and the rear wheel lowering guide rails to guide the front wheels, and lower connection rails that extend between lower parts of the front wheel lowering guide rails and the rear wheel lowering guide rails to guide the front wheels, cutouts or openings are formed in upper parts of the rear wheel lowering guide rails in the upper connection rails such that the rear wheels can move along the rear wheel lowering guide rails, and the lower end portions of the rear wheel lowering guide rails are movable rails that are configured to be vertically swingable in such a manner as to be pushed away by the front wheels when the front wheels pass from the lower connection rails to the lower end portions of the rear wheel lowering guide rails, or the lower end portions of the rear wheel lowering guide rails are movable rails that are configured to be vertically swingable, are biased upward so as not to interfere with the front wheels when the front wheels pass from the lower connection rails to the lower end portions of the rear wheel lowering guide rails, and swing downward against the force of the biasing when the rear wheels pass (claim 4).

According to this configuration, the lowering path part is formed by the simple structure in which the distance between the right-left outer sides of the right and left front wheels is large, the distance between the right-left outer sides of the right and left rear wheels is small, cutouts or openings are formed in the upper part of the rear wheel lowering guide rails in the upper connection rails that extend between the upper parts of the front wheel lowering guide rails and the rear wheel lowering guide rails to guide the front wheels such that the rear wheels can move along the rear wheel lowering guide rails, and the lower end portions of the rear wheel lowering guide rails are movable rails so as not to interfere with the passage of the front wheels. This achieves further reduction in manufacturing costs.

It is still further preferred that the return path part is provided with a deceleration means that decreases the speed of the transport vehicle entering from the lowering path part into the return path part and coasting there to a predetermined speed (claim 5).

According to this configuration, one or more deceleration means is provided at appropriate site(s) in the return path part depending on the weight of the transport vehicle, the speed of the transport vehicle entering the return path part, and the length of the return path part, whereby the transport vehicle having accelerated under its own weight can be decelerated by the deceleration means to a predetermined speed. This allows smooth transfer of the transport vehicle from the return path part to the raising path part.

It is still further preferred that the raising path part includes: right and left front wheel raising arms that are driven by a drive device to rotate in synchronization counterclockwise from left to right around a right-left axis and support and raise the right and left front wheels; right and left rear wheel raising arms that are driven by the drive device to rotate in synchronization counterclockwise from left to right around a right-left axis and support and raise the right and left rear wheels; right and left front wheel raising guide rails in an arc shape in a right-left view to guide an outer peripheral side of a movement path of the right and left front wheels supported by the front wheel raising arms; and right and left rear wheel raising guide rails in an arc shape in a right-left view to guide an outer peripheral side of a movement path of the right and left rear wheels supported by the rear wheel raising arms, and the transport vehicle is raised in almost the horizontal state in the raising path part while being guided by the front wheel raising guide rails and the rear wheel raising guide rails and being supported by the front wheel raising arms and the rear wheel raising arms (claim 6).

According to this configuration, the transport vehicle is moved in the raising path part by rotating the front wheel raising arms and the rear wheel raising arms by the drive device along the front wheel raising guide rails and the rear wheel raising guide rails. This configuration is simpler than the configuration in which the transport vehicle is moved in the raising path part by raising and lowering the table by the table raising and lowering lift device. This reduces manufacturing costs and the transport vehicle does not incline in the raising path part.

It is still further preferred that, immediately after unloading of the article on which work is completed at the work path part from the transport vehicle, the empty transport vehicle is lowered in the lowering path part (claim 7).

According to this configuration, in the present invention in which it is not necessary to provide a long high-speed fast-forward section between the conveyance path part and the lowering path part unlike in the case of the table raising and lowering lift device, immediately after unloading of the article on which work is completed at the work path part in the conveyance path part from the transport vehicle, the empty transport vehicle is lowered in the lowering path part. This further contributes to space saving.

It is still further preferred that a transport vehicle line in which a plurality of transport vehicles is closely aligned in the front-back direction is conveyed in the work path part by a constant-speed feeding device provided at an entry of the work path part and a brake feeding device provided at an exit of the work path part (claim 8).

According to this configuration, the transport vehicles are close to each other in the work path part, which shortens the entire length of the work path part. In addition, the entire transport vehicle line is moved by the constant-speed conveyance feeding device provided at the entry of the work path part and the brake feeding device provided at the exit of the work path part, thereby simplifying the feeding devices and reducing manufacturing costs and maintenance costs.

Advantageous Effects of Invention

As described above, according to the vertical circulating conveyor of the present invention, it is possible to provide significantly advantageous effects as follows:

(1) The transport vehicle can be moved in the lowering path part under its own weight in a powerless manner to contribute to energy saving and space saving and reduce manufacturing costs and maintenance costs;

(2) It is not necessary to provide a long high-speed fast-forward section unlike in the configuration in which the transport vehicle is moved in the lowering path part by raising and lowering the table by the table raising and lowering lift device, which contributes to space saving;

(3) It is not necessary to lower the table in the raised position to the lowered position and then return the table to the raised position unlike in the configuration in which the transport vehicle is moved in the lowering path part by raising and lowering the table by the table raising and lowering lift device, and the transport vehicle can be continuously lowered, thereby shortening the conveyance cycle time; and (4) The vertical circulating conveyor has the section in which the transport vehicle having fallen from the lowering path part under its weight coasts and moves in the return path part in a powerless manner, which decreases or eliminates the feeding devices for moving the transport vehicle to the downstream side of the return path part, thereby reducing manufacturing costs and maintenance costs.

DESCRIPTION OF EMBODIMENTS

Figure 1:
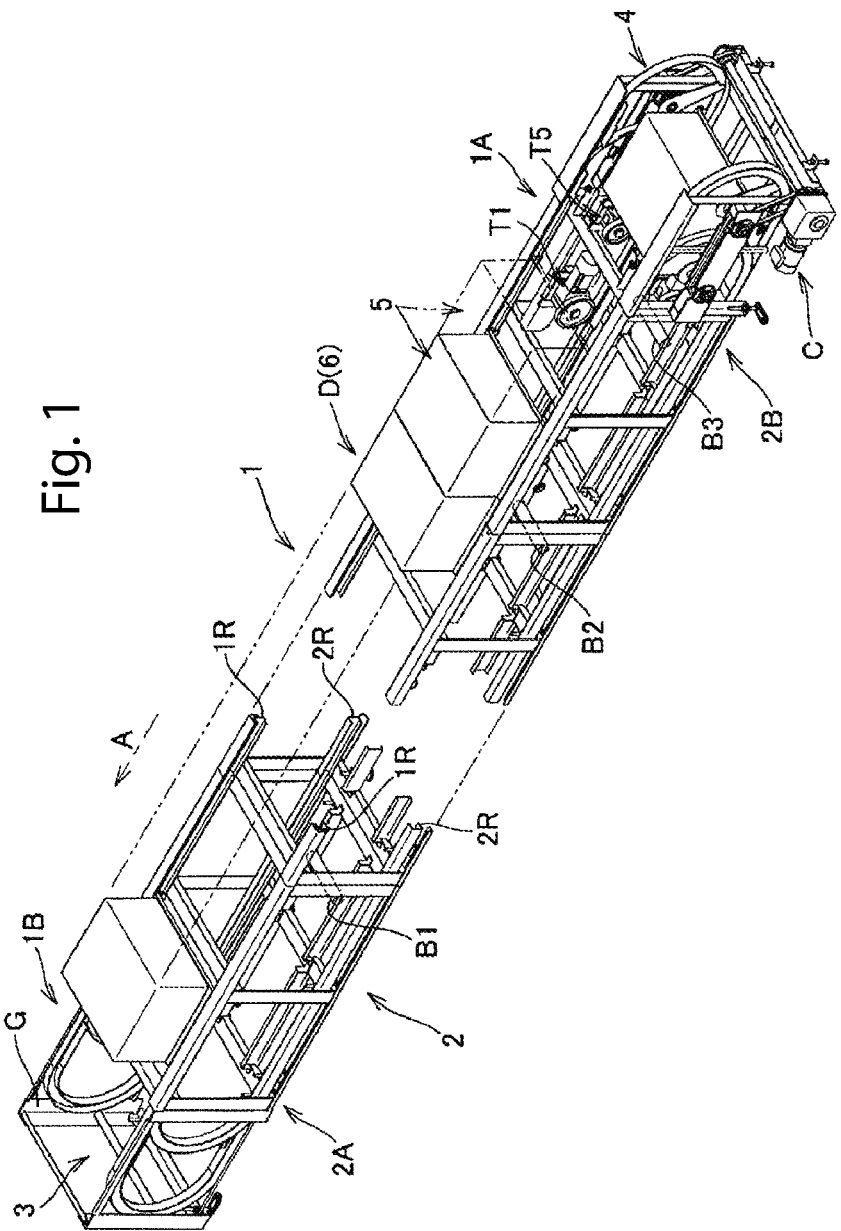
FIG. 1 is a perspective view of a vertical circulating conveyor according to a first embodiment of the present invention.

Embodiments of the present invention will be described with reference to the drawings.

The front, back, right, and left sides will be defined along movement direction A in a conveyance path part 1 (upstream side to downstream side of the conveyance path part 1), and the view seen from the left side will be regarded as front view.

First Embodiment

As illustrated in the perspective view of FIG. 1 and the front view of FIG. 2, a vertical circulating conveyor according to a first embodiment of the present invention is configured to move transport vehicles 5, 5, . . . capable of loading articles not illustrated along a vertical circulating path composed of a linear conveyance path part 1 and a linear return path part 2 positioned below the conveyance path part 1; a lowering path part 3 that connects a downstream end portion 1B of the conveyance path part 1 and an upstream end portion 2A of the return path part 2; and a raising path part 4 that connects a downstream end portion 2B of the return path part 2 and an upstream end portion 1A of the conveyance path part 1, and have a work path part 6 at which work is performed on the articles in the conveyance path part 1.

Figure 3A:
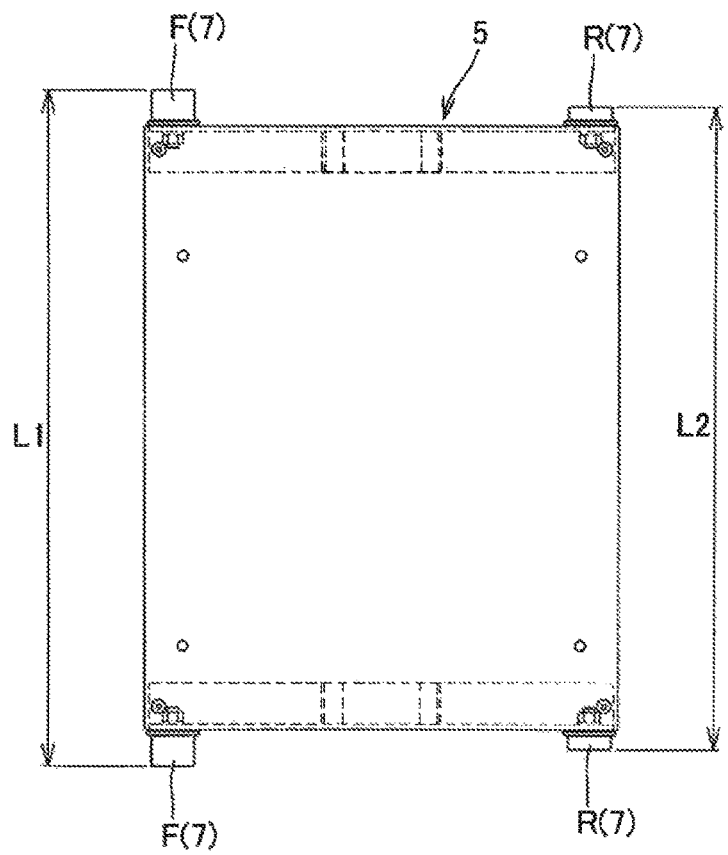
FIG. 3(*a*) is a plane view of a transport vehicle, and FIG. 3(*b*) is a front view of the transport vehicle.
Figure 3B:
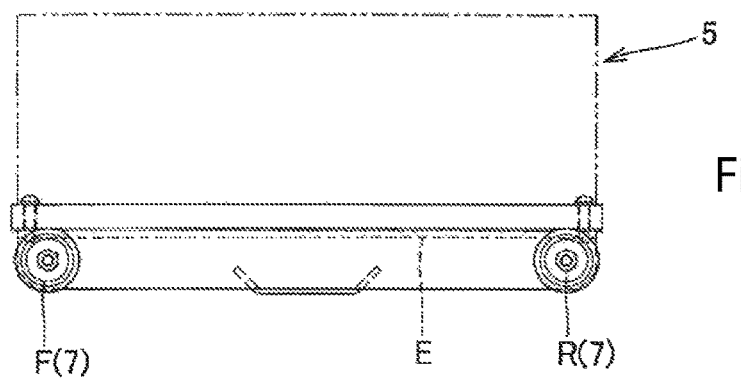

In the embodiment, the transport vehicle 5 includes a jig or the like illustrated simply in a cubic shape, and has front wheels F and F as front-side right and left running wheels 7 and 7 and rear wheels R and R as rear-side right and left wheels 7 and 7 as illustrated in the plane view of FIG. 3(a) and the front view of FIG. 3(b).

Figure 2:
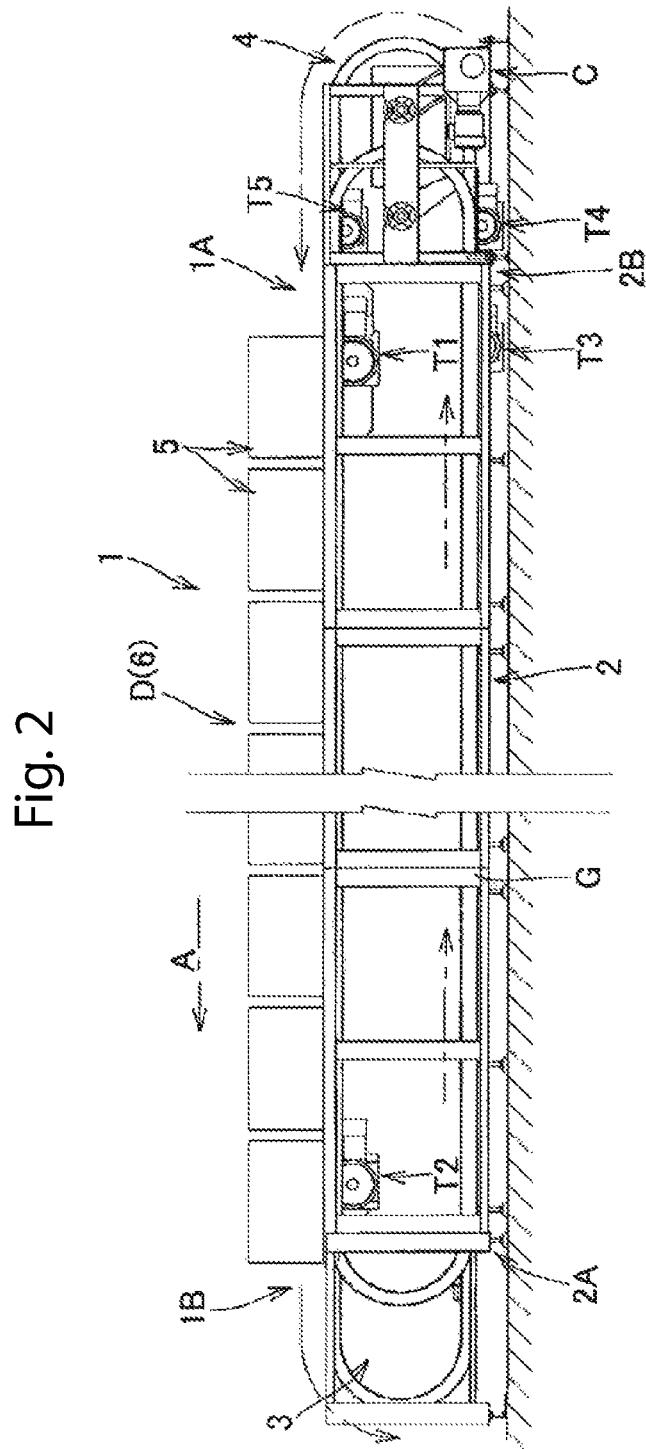
FIG. 2 is a front view of the same.

In addition, the transport vehicle 5 is imparted moving force by pressure-adhering friction rollers in feeding devices T1, T2, T3, T4, and T5 illustrated in FIGS. 1 and 2 to a bottom surface E illustrated in FIG. 3(b).

Figure 4:
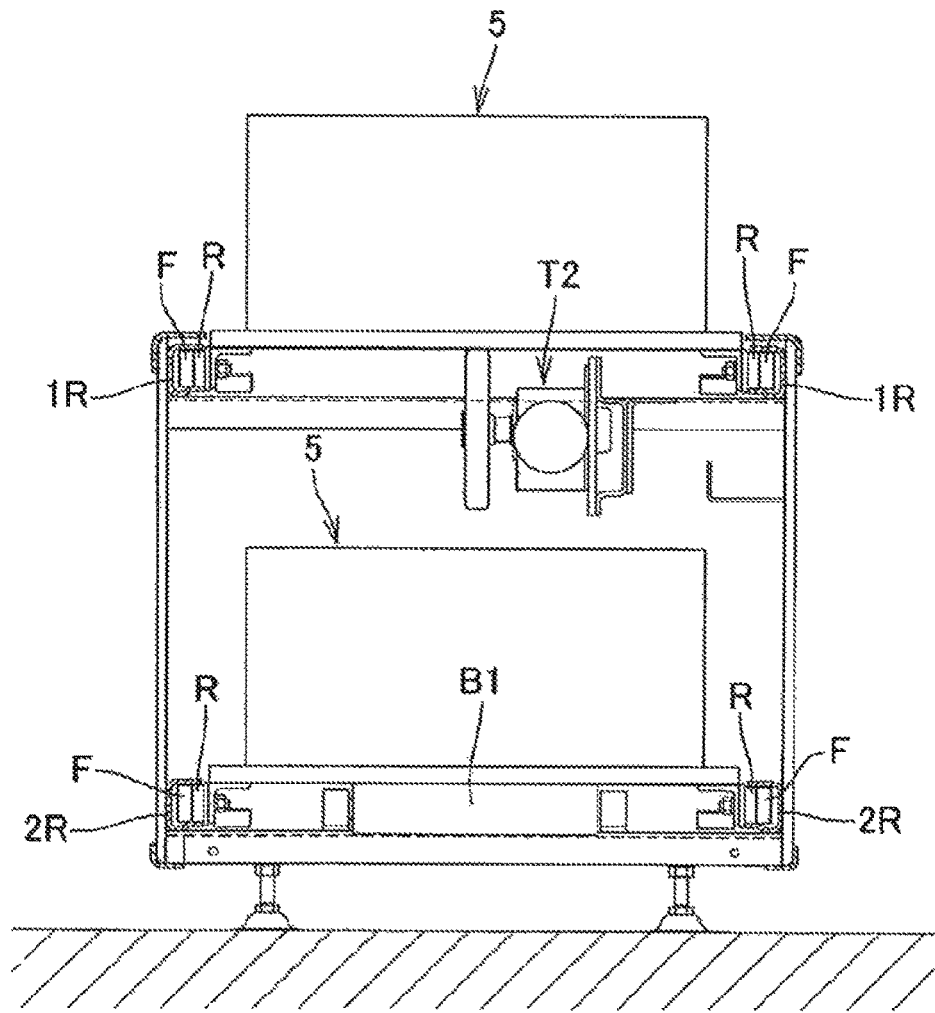
FIG. 4 is a vertical cross-sectional view of the transport vehicle moving in a conveyance path part and a return path part as seen from the back side.

As illustrated in the vertical cross-sectional view seen from the back side of FIG. 4, the transport vehicle 5 moves along right and left guide rails 1R and 1R with the running wheels 7 and 7 engaged with the guide rails 1R and 1R in the conveyance path part 1 illustrated in FIGS. 1 and 2, and moves along right and left guide rails 2R and 2R with the running wheels 7 and 7 engaged with the guide rails 2R and 2R in the return path part 2 illustrated in FIGS. 1 and 2.

As illustrated in FIGS. 1 and 2, a constant-speed conveyance feeding device T1 provided at the entry of the work path part 6 and a brake feeding device T2 provided at the exit of the work path part 6 convey a transport vehicle line D in which a plurality of transport vehicles 5, 5, . . . is closely aligned in a front-back direction in the work path part 6 at a low speed suited to the contents of the work.

According to this configuration, the transport vehicles 5, 5, . . . are close to each other in the work path part 6, thereby making it possible to shorten the entire length of the work path part 6. In addition, the constant-speed conveyance feeding device T1 at the entry of the work path part 6 and the brake feeding device T2 at the exit of the work path part 6 move the entire transport vehicle line D, thereby allowing the feeding devices to be simplified and reducing manufacturing costs and maintenance costs.

In this configuration, a loading step not illustrated for loading the articles into the transport vehicles 5 is provided at the most upstream position in the work path part 6 or an upstream position beyond the work path part 6. In addition, an unloading step not illustrated for unloading the articles having undergone work from the transport vehicles 5 is provided at the most downstream position in the work path part 6 or a downstream position beyond the work path part 6.

Next, a configuration of the lowering path part 3 will be described in detail.

As illustrated in FIG. 3(a), the transport vehicle 5 has a distance L2 between the right-left outer sides of the right and left rear wheels R and R smaller than a distance L1 between the right-left outer sides of the right and left front wheels F and F (L1>L2).

Figure 5A:
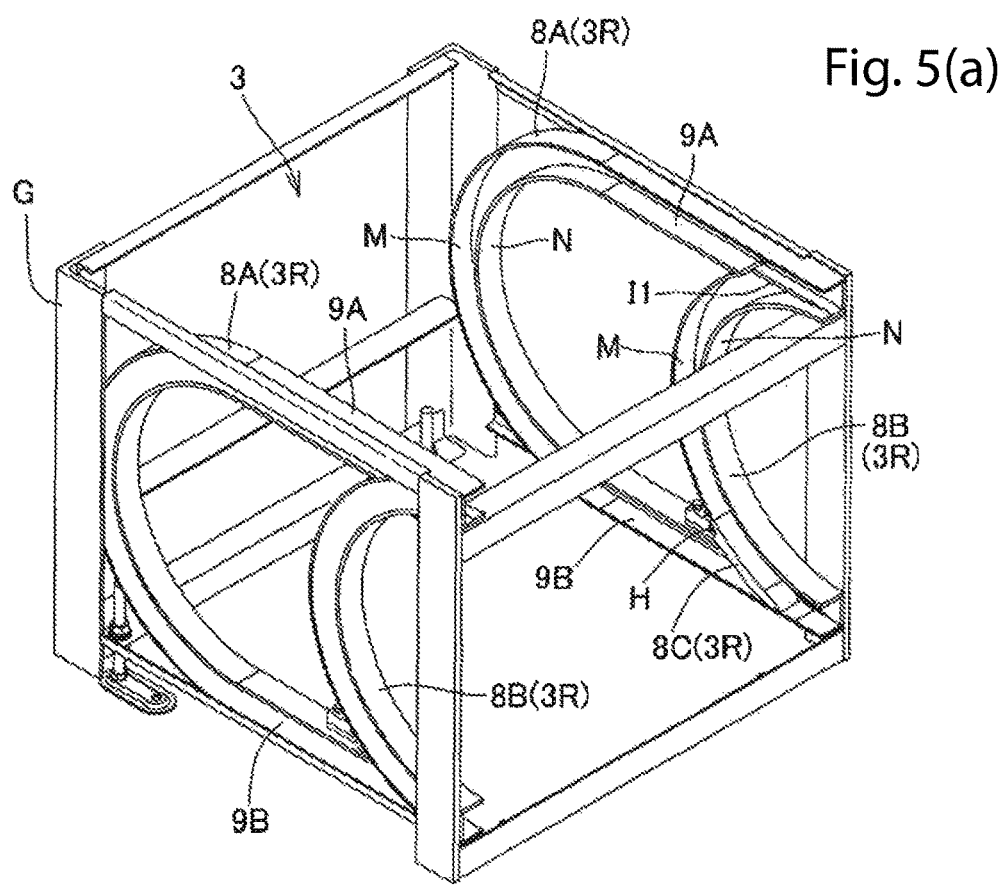
FIG. 5(*a*) is a perspective view of a lowering path part, and FIG. 5(*b*) is a lateral plane view of cutouts in right and left upper connection rails.
Figure 6:
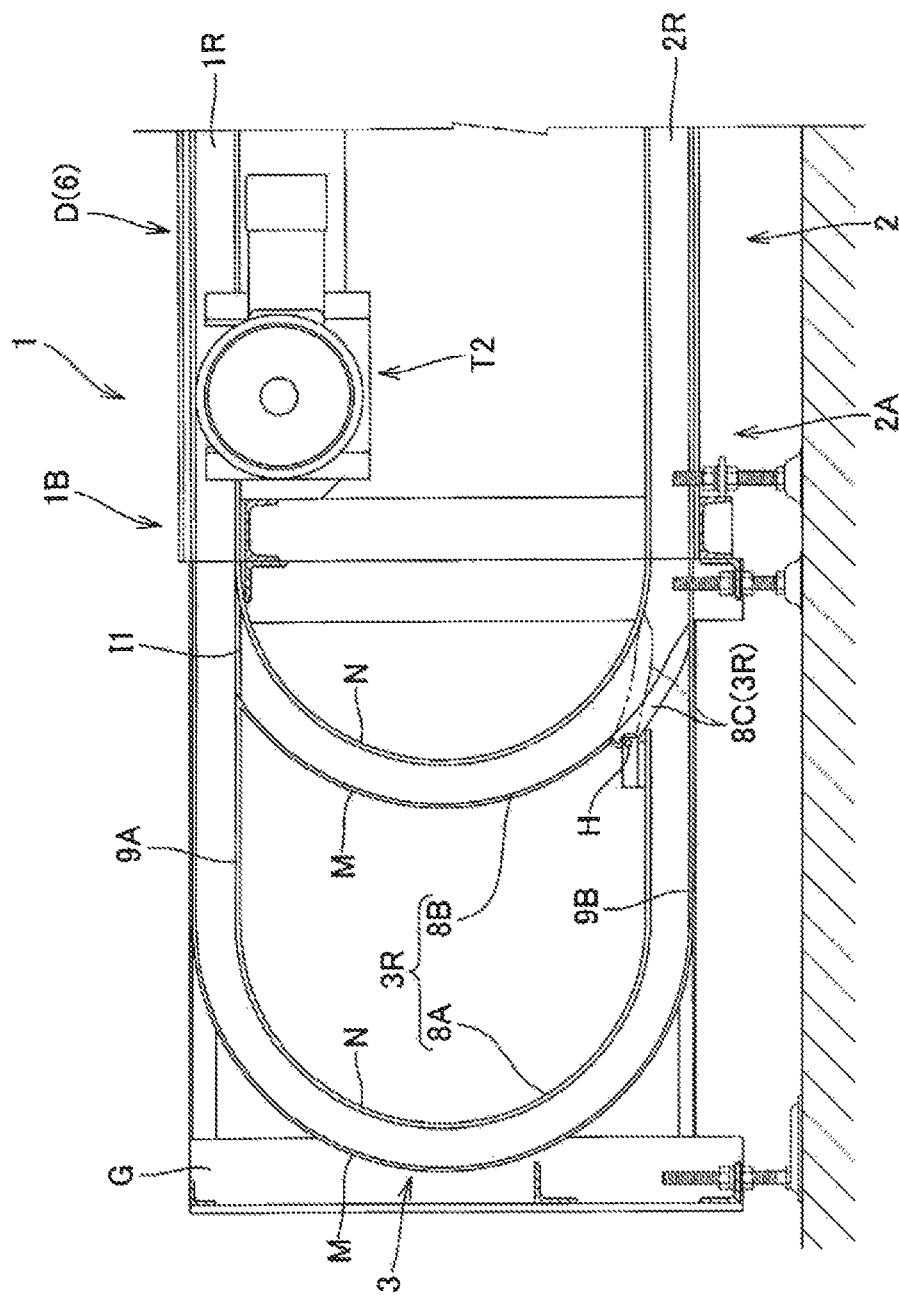
FIG. 6 is a vertical front view of a configuration around the lowering path part.

As illustrated in the perspective view of FIG. 5(a) and the vertical front view of FIG. 6, the lowering path part 3 has lowering guide rails 3R fixed to a machine frame G. The lowering guide rails 3R have front receiving pieces M and rear receiving pieces N, and guides the running wheels 7, 7, . . . of the lowering transport vehicle 5.

The lowering guide rails 3R are composed of right and left front wheel lowering guide rails 8A and 8A that are convex on the front side and arc-shaped in a right-left view to guide the front wheels F and F of the transport vehicle 5, and right and left rear wheel lowering guide rails 8B and 8B that are convex on the front side and arc-shaped in a right-left view to guide the rear wheels R and R of the transport vehicle 5.

Upper connection rails 9A and 9A extend between the upper parts of the front wheel lowering guide rails 8A and 8A and the rear wheel lowering guide rails 8B and 8B to guide the front wheels F and F.

Lower connection rails 9B and 9B extend between the lower parts of the front wheel lowering guide rails 8A and 8A and the rear wheel lowering guide rails 8B and 8B to guide the front wheels F and F.

The front wheel lowering guide rails 8A and the rear wheel lowering guide rails 8B, and the upper connection rails 9A and the lower connection rails 9B are formed from steel channel materials, for example.

Figure 5B:
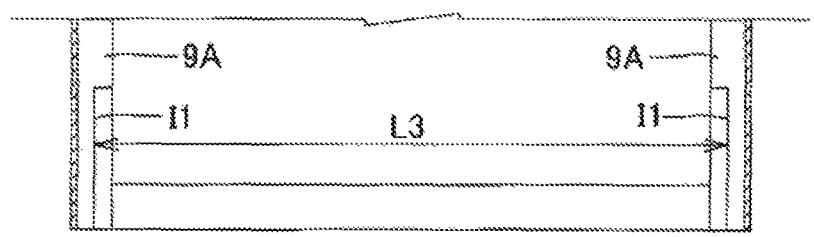

As illustrated in the perspective view of FIG. 5(a) and the lateral plane view of FIG. 5(b), cutouts I1 and I1 are formed in the portions of the upper connection rails 9A and 9A extend on the upper parts of the rear wheel lowering guide rails 8B and 8B. Distance L3 between the right and left cutouts I1 and I1 illustrated in FIG. 5(b) is smaller than the distance L1 between the right-left outer sides of the right and left front wheels F and F illustrated in FIG. 3(a), and is larger than the distance L2 between the right-left outer sides of the right and left rear wheels R and R (L1>L3>L2).

Accordingly, the front wheels F and F move forward along the upper connection rails 9A and 9A through the portions of the upper connection rails 9A and 9A with the cutouts I1 and I1, and the rear wheels R and R move downward from the cutouts I1 and I1 along the rear wheel lowering guide rails 8B and 8B, not along the upper connection rails 9A and 9A.

The lower end portions of the rear wheel lowering guide rails 8B and 8B are set as movable rails 8C and 8C that are vertically swingable around horizontal direction support shafts H in a right-left view.

Accordingly, the rear wheels R and R move along the upper surfaces of the movable rails 8C and 8C and enter into the return path part 2 (the guide rails 2R and 2R). The front wheels R and R press the lower surfaces of the movable rails 8C and 8C when moving from the lower connection rails 9B and 9B to the return path part 2 (the guide rails 2R and 2R), and push away the movable rails 8C and 8C and enter into the return path part 2 (the guide rails 2R and 2R).

The configuration of the transport vehicle 5 and the lowering path part 3 are not limited to the one described above. The transport vehicle 5 and the lowering path part 3 may be configured in any manner such that the transport vehicle 5 in which the distance between the right-left outer sides of the front wheels F and F and the distance between the right-left outer sides of the rear wheels R and R are changed (for example, in contrast to the embodiment, the distance between the right-left outer sides of the rear wheels R and R is larger than the distance between the right-left outer sides of the front wheels F and F) is used, and the lowering guide rails 3R composed of right and left front wheel lowering guide rails convex on the front side and arc-shaped in the right-left view to guide the front wheels F and F, and right and left rear wheel lowering guide rails convex on the front side and arc-shaped in the right-left view to guide the rear wheels R and R are used, and the transport vehicle 5 is lowered in almost the horizontal state in the lowering path part 3 while the front wheels F and F are guided by the front wheel lowering guide rails and the rear wheels R and R are guided by the rear wheel lowering guide rails.

Next, a configuration of the raising path part 4 will be described in detail.

Figure 7:
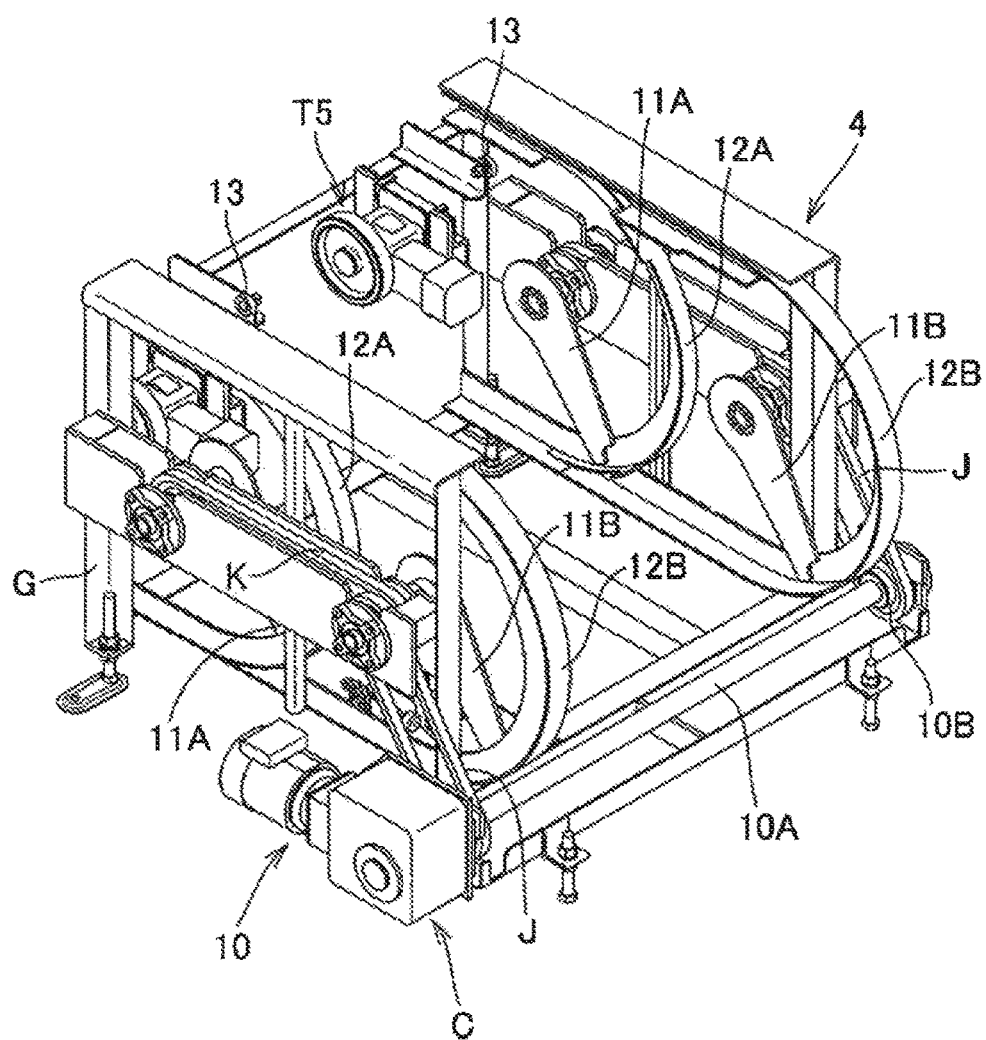
FIG. 7 is a perspective view of a raising path part.
Figure 8:
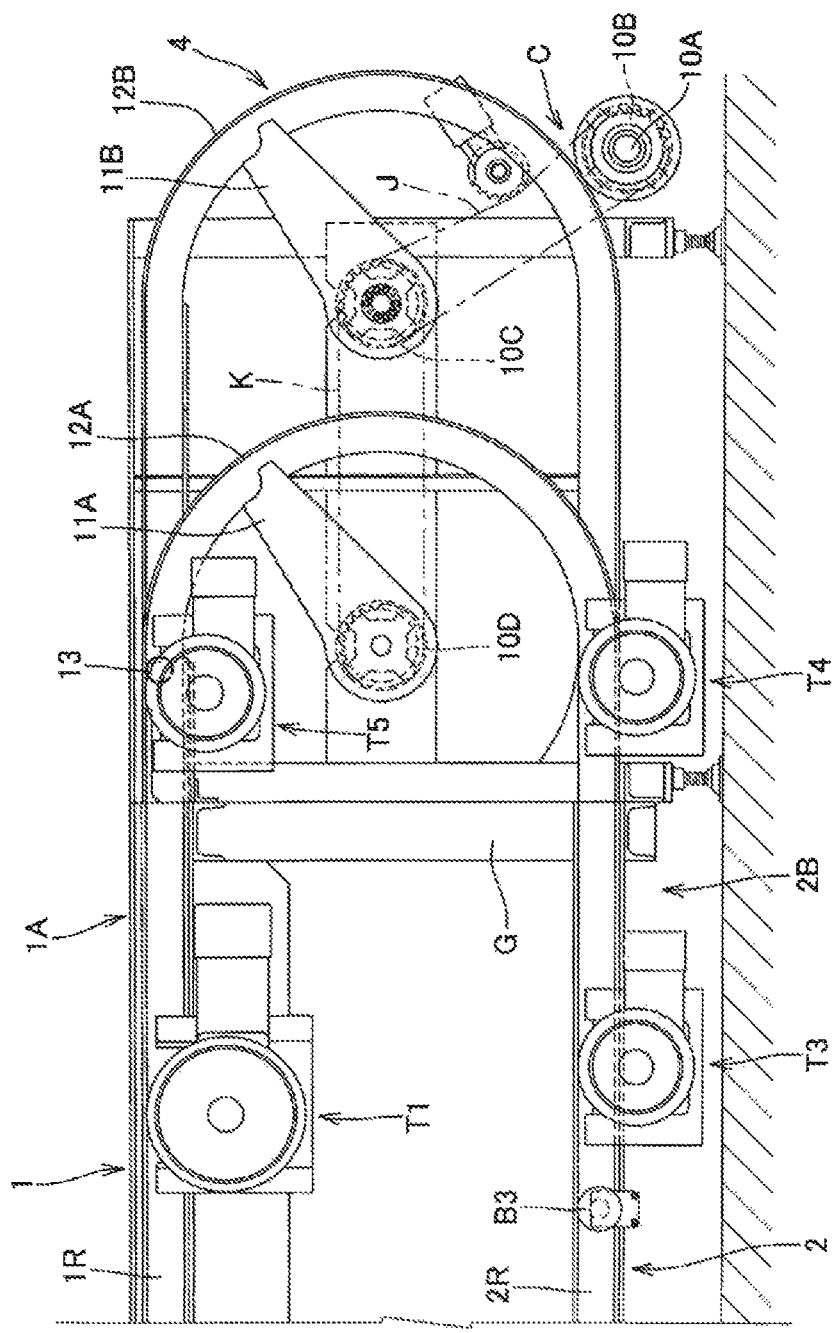
FIG. 8 is a vertical front view of a configuration around the raising path part.

As illustrated in the perspective view of FIG. 7 and the vertical front view of FIG. 8, the raising path part 4 includes right and left front wheel raising arms 11A and 11A and right and left rear wheel raising arms 11B and 11B that are driven by a drive device C to rotate in synchronization counter-clockwise from left to right around a right-left axis. The right and left front wheel raising arms 11A and 11A support and raise the front wheels F and F of the transport vehicle 5, and the right and left rear wheel raising arms 11B and 11B support and raise the rear wheels R and R of the transport vehicle 5.

In addition, the raising path part 4 includes right and left front wheel raising guide rails 12A and 12A convex on the back side and arc-shaped in a right-left view that are fixed to the machine frame G to guide the outer periphery of the movement path of the front wheels F and F supported by the front wheel raising arms 11A and 11A, and right and left rear wheel raising guide rails 12B and 12B convex on the back side and arc-shaped in a right-left view that are fixed to the machine frame G to guide the outer periphery of the movement path of the rear wheels R and R supported by the rear wheel raising arms 11B and 11B.

Further, a feeding device T4 is arranged in the return path part 2 at a position near a downstream end portion 2B, and a feeding device T5 is arranged in the conveyance path part 1 at a position near an upstream end portion.

The drive device C includes: a geared motor 10; driving sprockets 10B and 10B that are attached on the right and left sides of a drive shaft 10A coupled to an output shaft of the geared motor 10; driven sprockets 10C and 10C that are fixed to rotation shafts of the rear wheel raising arms 11B and 11B; driven sprockets 10D and 10D that are fixed to rotation shafts of the front wheel raising arms 11A and 11A; roller chains J and J that are hung over the driving sprockets 10B and 10B and the driven sprockets 10C and 10C; and roller chains K and K that are hung over the driven sprockets 10C and 10C and the driven sprockets 10D and 10D, and others.

The configuration of the raising path part 4 is not limited to the one described above but the raising path part 4 may include a table raising and lowering lift device.

However, by configuring the raising path part 4 as in the embodiment such that the front wheel raising arms 11A and 11A and the rear wheel raising arms 11B and 11B are rotated by the drive device C along the front wheel raising guide rails 12A and 12A and the rear wheel raising guide rails 12B and 12B to move the transport vehicle 5 in the raising path part 4, it is possible to reduce manufacturing costs because it is simpler than the configuration in which the transport vehicle is moved in the raising path part by raising and lowering the table by the table raising and lowering lift device.

Next, operations of the vertical circulating conveyor according to the first embodiment of the present invention will be described.

Referring to FIGS. 1 and 2, while the transport vehicle line D is moved by the feeding devices T1 and T2 at a low speed to the downstream side (movement direction A), desired work is performed on the articles loaded on the transport vehicles 5, 5, ... in the work path part 6, and then the articles are unloaded from the transport vehicles 5 at the unloading step.

The empty transport vehicles 5 exit the feeding device T2 and enter the lowering path part 3.

By lowering the empty transport vehicles 5 in the lowering path part 3 immediately after the articles on which the work is completed at the work path part 6 are unloaded from the transport vehicles 5 as in the embodiment, it is possible to further contribute to space saving.

Figure 9:
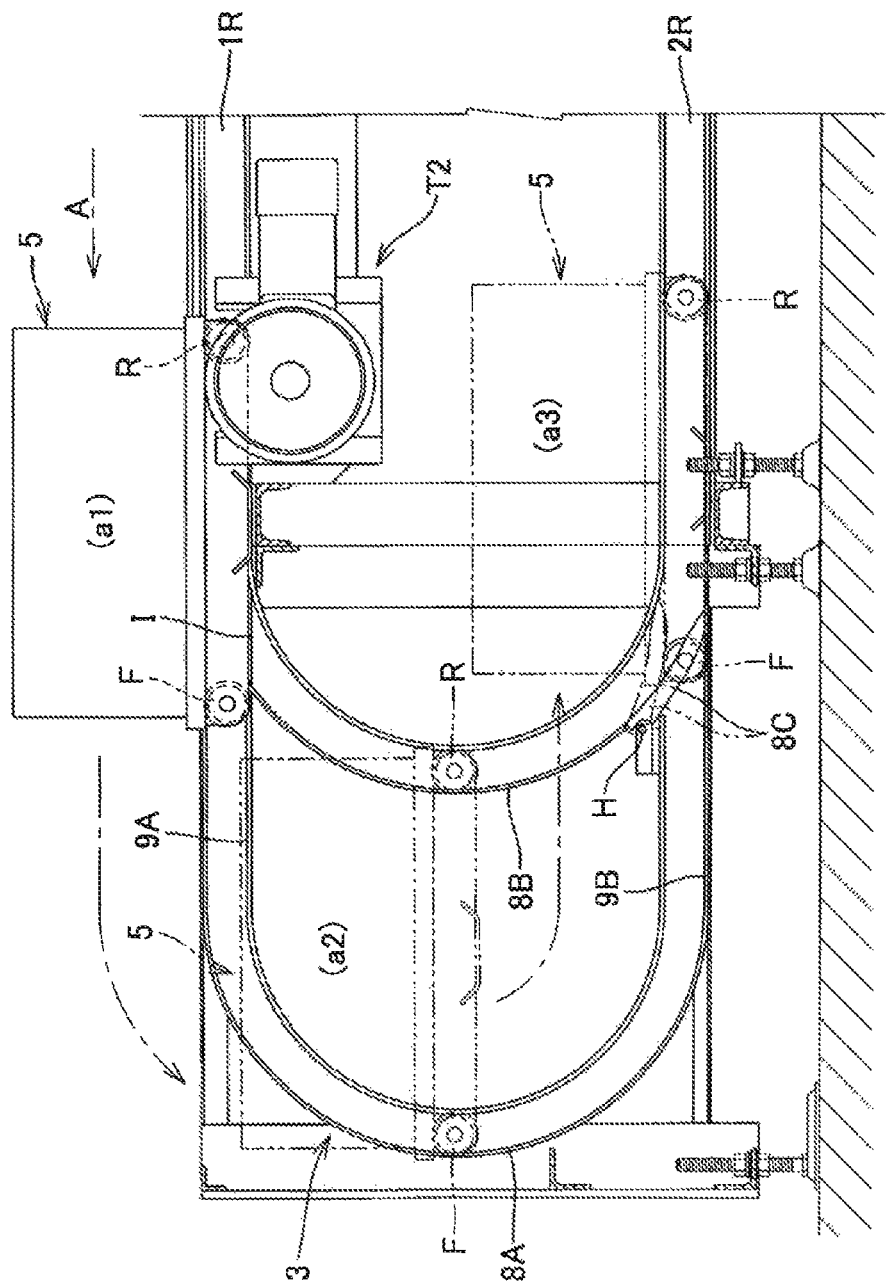
FIG. 9 is an operation descriptive vertical front view illustrating movement of the transport vehicle in the lowering path part.

As illustrated with (a1), (a2), and (a3) in the operation descriptive vertical front view of FIG. 9, the transport vehicle 5 falls under its own weight in almost the horizontal state and moves to the downstream side while the front wheels F and F are guided by the upper connection rails 9A and 9A, the front wheel lowering guide rails 8A and 8A, and the lower connection rails 9B and 9B, and the rear wheels R and R are guided by the guide rails 1R and 1R, the rear wheel lowering guide rails 8B and 8B, and the guide rails 2R and 2R.

The transport vehicle 5 having entered the return path part 2 coasts and moves in a powerless manner in the return path part 2 with momentum of falling under its own weight in the lowering path part 3.

As illustrated in FIG. 1, the return path part 2 has brake rollers B1, B2, and B3 as deceleration means and centrifugal brakes that have the property of increasing braking torque at an increasing rotation rate arranged at appropriate positions (the capacity and number of brake rollers are selected as appropriate). Accordingly, the transport vehicle 5 coasting toward the raising path part 4 is decelerated by the brake rollers B1, B2, and B3 to a predetermined proper speed.

Therefore, the transport vehicle 5 can be delivered smoothly from the return path part 2 to the raising path part 4.

When the return path part 2 is long and the transport vehicle 5 having fallen under its weight from the lowering path part 3 and coasted the return path part 2 stops in the middle of the return path part 2, a feeding device is installed at an appropriate position to move the transport vehicle 5 in the return path part 2 to the downstream side.

The transport vehicle 5 moving in the return path part 2 to the downstream side approaches the feeding device T3 illustrated in FIGS. 2 and 8.

The feeding device T3 detects the approach of the transport vehicle 5 and is activated to move at almost the same speed as the moving speed of the transport vehicle 5 before the entry of the transport vehicle 5.

Since the feeding device T3 stops, the transport vehicle 5 having entered the feeding device T3 stops at a standby position before entry into the feeding device T4 of the raising path part 4.

Figure 10:
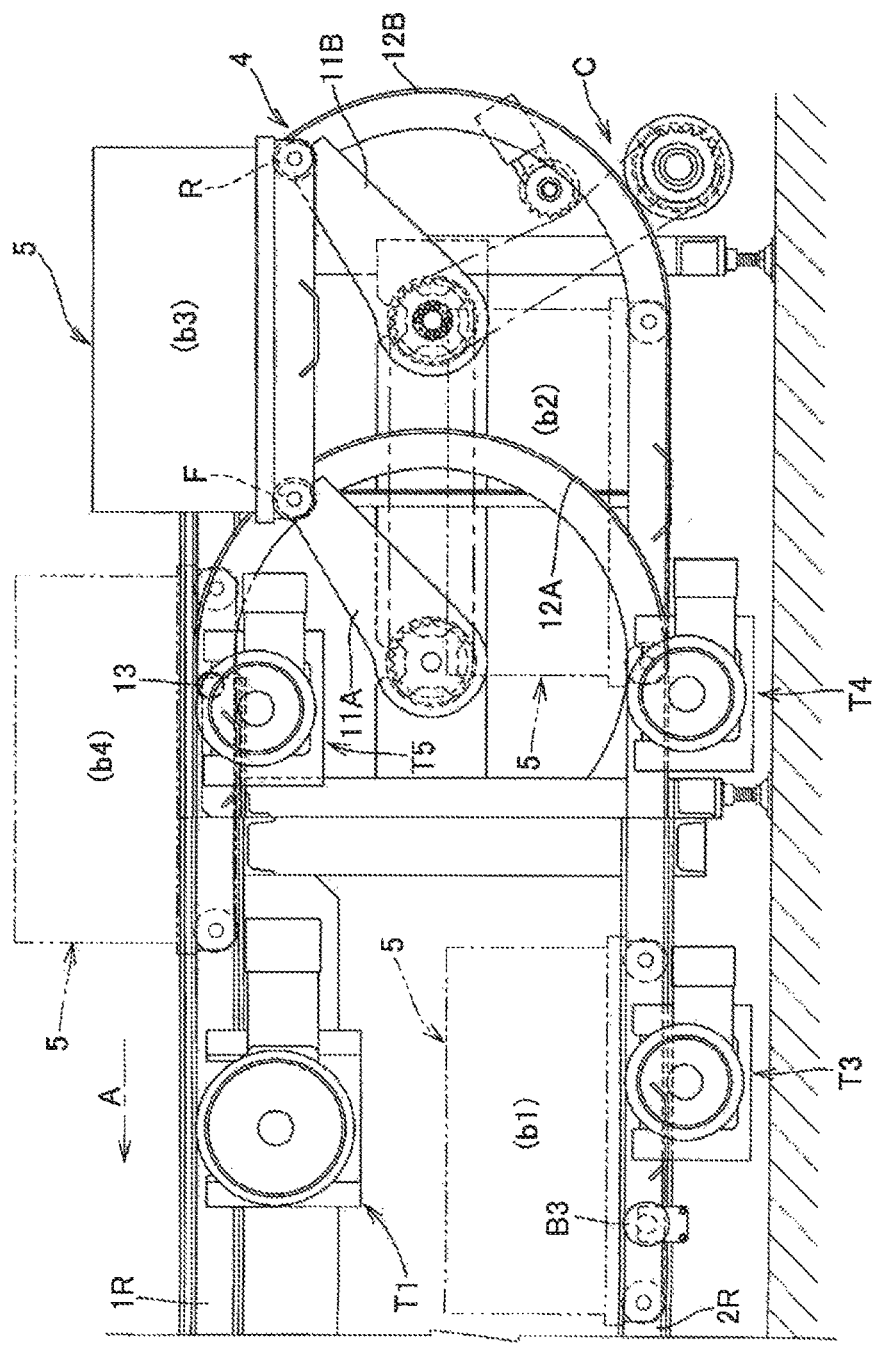
FIG. 10 is an operation descriptive vertical front view illustrating movement of the transport vehicle in the raising path part.

The feeding devices T3 and T4 are activated at a timing when the front wheel raising arms 11A and 11A and the rear wheel raising arms 11B and 11B illustrated in FIG. 8 face almost upward to convey the transport vehicle 5 as illustrated with (b1) and (b2) in the operation descriptive vertical front view of FIG. 10 and then stop the transport vehicle 5.

From this state, the transport vehicle 5 is raised in almost the horizontal state by the front wheel raising arms 11A and 11A and the rear wheel raising arms 11B and 11B rotating in synchronization as illustrated with (b2) to (b3) of FIG. 10.

In addition, when the transport vehicle 5 moves from (b3) to (b4) of FIG. 10, the bottom surface E of the transport vehicle 5 (see FIG. 3(b)) is supported by right and left support rollers 13 and 13 (also see FIG. 7), and the transport vehicle 5 is delivered by the feeding device T5 onto the guide rails 1R and 1R. Then, the transport vehicle 5 having fed at a high speed by the feeding device T5 abuts against the transport vehicle 5 on the most upstream side in the transport vehicle line D moving at a low speed illustrated in FIG. 1, and is fed by the constant-speed conveyance feeding device T1 to the downstream side.

Second Embodiment

A vertical circulating conveyor according to a second embodiment of the present invention is different from the vertical circulating conveyor according to the first embodiment only in the configuration of the lowering path part 3. Accordingly, only the details of the configuration of the lowering path part 3 will be provided. In the perspective view of FIG. 11, the vertical front view of FIG. 12($a$), and the lateral plane view of FIG. 12($b$), the same reference signs as those in the perspective view of FIG. 5($a$), the lateral plane view of FIG. 5($b$), and the vertical front view of FIG. 6 represent the same or equivalent components.

Figure 11:
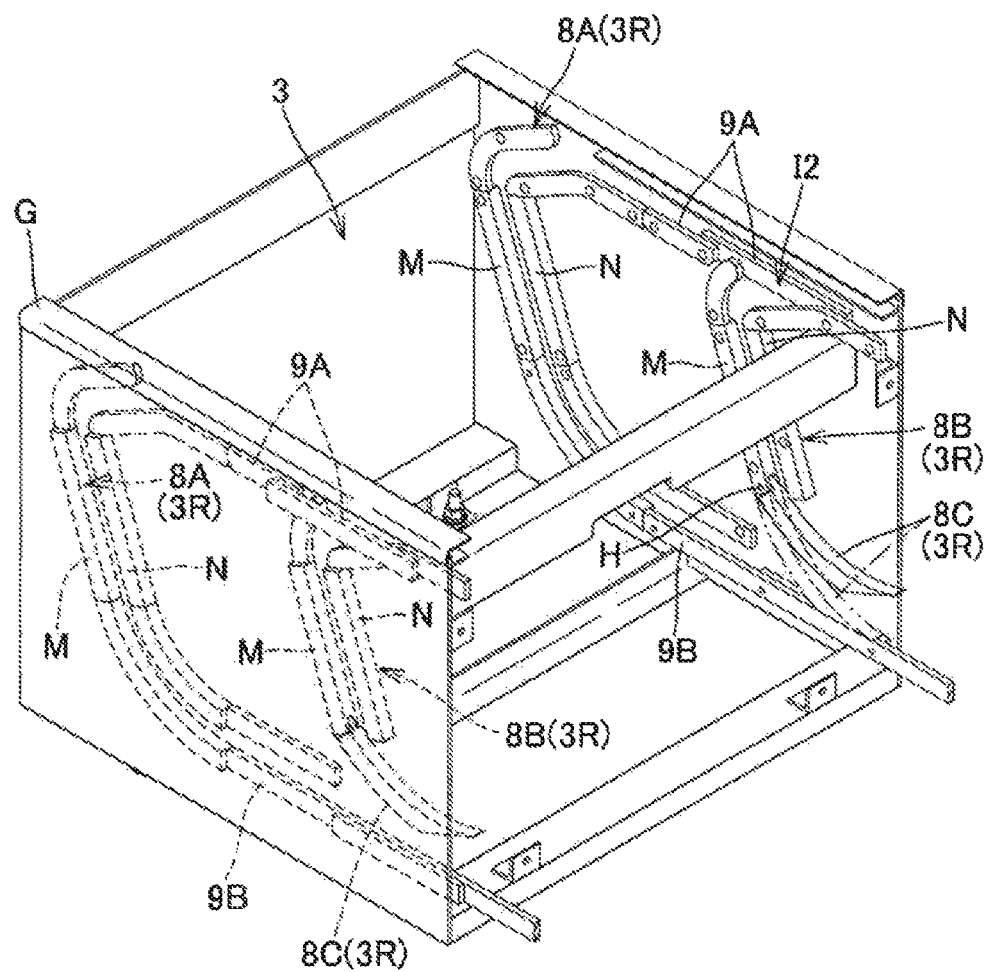
FIG. 11 is a perspective view of a lowering path part in a vertical circulating conveyor according to a second embodiment of the present invention.
Figure 12A:
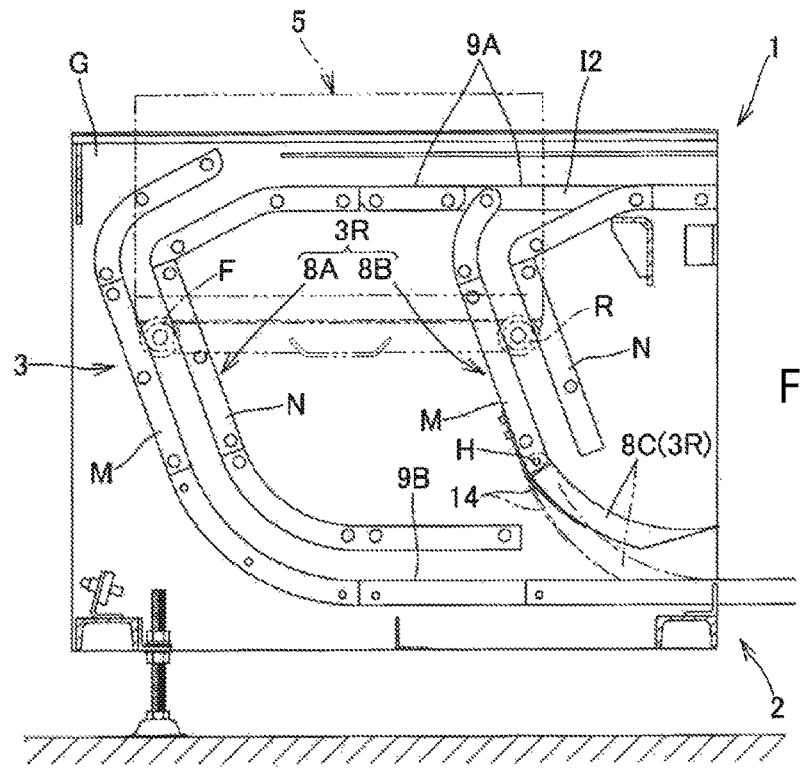
FIG. 12(*a*) is a vertical front view of the lowering path part, and FIG. 12(*b*) is a lateral front view of openings in right and left connection rails and their surroundings.
Figure 12B:
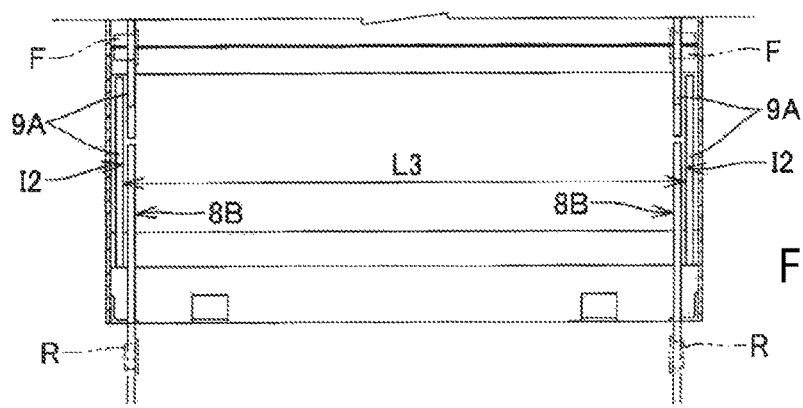

As illustrated in the perspective view of FIG. 11 and the vertical front view of FIG. 12($a$), in the lowering path part 3, the lowering guide rails 3R are fixed to the machine frame G, and the lowering guide rails 3R having the front receiving pieces M and the back receiving pieces N guide the running wheels 7, 7, . . . of the lowering transport vehicle 5.

The lowering guide rails 3R are composed of the right and left front wheel lowering guide rails 8A and 8A to guide the front wheels F and F of the transport vehicle 5 and the right and left rear wheel lowering guide rails 8B and 8B to guide the rear wheels R and R of the transport vehicle 5. The lowering guide rails 3R are not convex on the front side and arc-shaped in a right-left view unlike in the first embodiment but are convex on the front side and L-shaped in a front view, and the peak position of the L shape is closer to the conveyance path part 1 than the return path part 2.

The upper connection rails 9A and 9A extend between the upper parts of the front wheel lowering guide rails 8A and 8A and the rear wheel lowering guide rails 8B and 8B to guide the front wheels F and F.

The lower connection rails 9B and 9B extend between the lower parts of the front wheel lowering guide rails 8A and 8A and the rear wheel lowering guide rails 8B and 8B to guide the front wheels F and F.

The front wheel lowering guide rails 8A, the rear wheel lowering guide rails 8B, the upper connection rails 9A, and the lower connection rails 9B are formed from a synthetic resin, for example.

As illustrated in the perspective view of FIG. 11 and the lateral plane view of FIG. 12($b$), openings I2 and I2 are formed in the portions of the upper connection rails 9A and 9A extending on the upper parts of the rear wheel lowering guide rails 8B and 8B. The distance L3 between the right and left openings I2 and I2 illustrated in FIG. 12($b$) is smaller than the distance L1 between the right-left outer sides of the right and left front wheels F and F illustrated in FIG. 3($a$), and is larger than the distance L2 between the right-left outer sides of the right and left rear wheels R and R illustrated in FIG. 3($a$) (L1>L3>L2).

Accordingly, the front wheels F and F move forward along the upper connection rails 9A and 9A through the sites with the openings I2 and I2 in the upper connection rails 9A and 9A, and the rear wheels R and R move downward from the openings I2 and I2 along the rear wheel lowering guide rails 8B and 8B, not along the upper connection rails 9A and 9A.

The lower end portions of the rear wheel lowering guide rails 8B and 8B are set as movable rails 8C and 8C that are configured to be vertically swingable, are biased upward by plate springs 14 and 14 (see FIG. 12($a$)) as elastic biasing means so as not to interfere with the front wheels F and F when the front wheels F and F pass from the lower connection rails 9B and 9B to the lower end portions of the rear wheel lowering guide rails 8B and 8B, and swing downward against the force of the biasing when the rear wheels R and R pass. The movable rails 8C and 8C may be the same as the vertically swingable movable rails 8C and 8C in the first embodiment (see FIG. 5($a$), FIG. 5($b$) and FIG. 6).

Next, the details of advantageous effects based on the shapes of the lowering guide rails 3R (the front wheel lowering guide rails 8A and the rear wheel lowering guide rails 8B) will be provided.

Figure 13A:
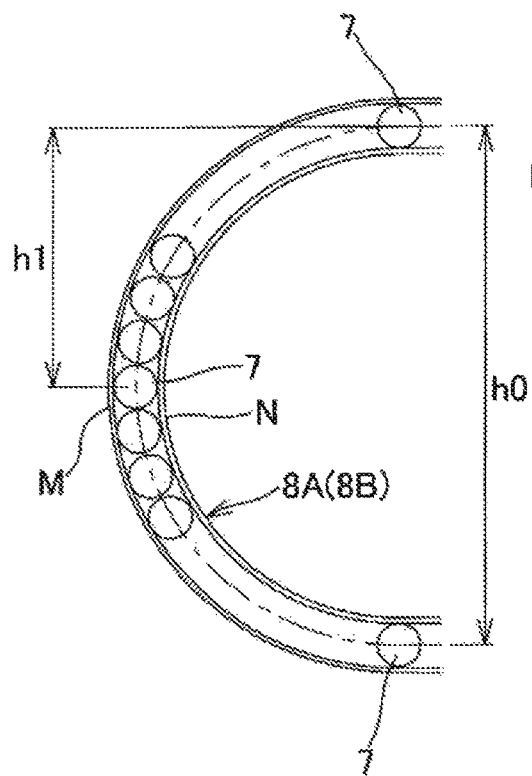
FIGS. 13(*a*) and 13(*b*) are schematic front views for describing the lowering state of the transport vehicle in the lowering path part, and FIG. 13(*a*) illustrates first embodiment and FIG. 13(*b*) illustrates second embodiment.
Figure 13B:
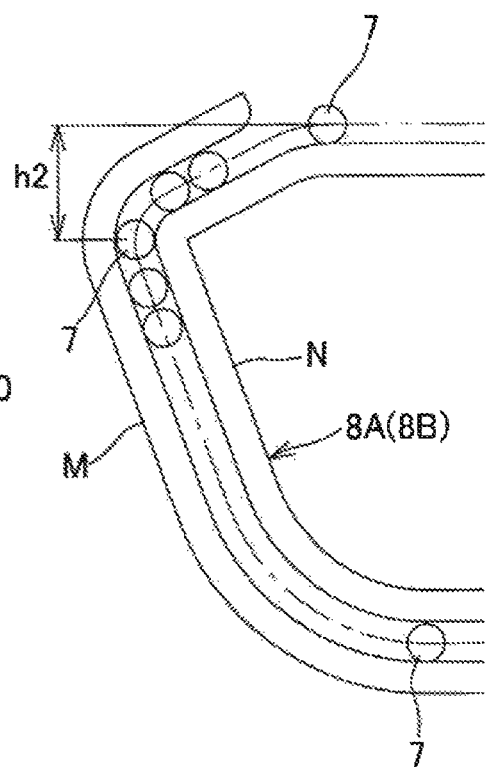

FIGS. 13($a$) and 13($b$) are schematic front views for describing the lowering state of the transport vehicle 5 in the lowering path part 3. FIG. 13($a$) illustrates the first embodiment and FIG. 13($b$) illustrates the second embodiment.

In the first embodiment illustrated in FIG. 13($a$), a height-direction distance h1 from the position of the running wheels 7 in the conveyance path part 1 to the position of the running wheels 7 where the front-back movement direction is reversed in the lowering path part 3 is half of a height-direction distance h0 from the position of the running wheels 7 in the conveyance path part 1 to the position of the running wheels 7 in the return path part 2 (h1=h0/2).

Meanwhile, in the second embodiment of FIG. 13($b$), a height-direction distance h2 from the position of the running wheels 7 in the conveyance path part 1 to the position of the running wheels 7 where the front-back movement direction is reversed in the lowering path part 3 is made smaller than half of the height-direction distance h0 from the position of the running wheels 7 in the conveyance path part 1 to the position of the running wheels 7 in the return path part 2 (h2<h0/2).

Therefore, the speed at which the running wheels 7 collide with the front receiving pieces M when the front-back movement direction is reversed from the state in which the running wheels 7 are lowered by gravity along the rear receiving pieces N on the front wheel lowering guide rails 8A and the rear wheel lowering guide rails 8B with a clearance of about 2 mm from the running wheels 7, for example, is lower in the second embodiment than in the first embodiment because the gap is h2<h1 and potential energy (gravity×height) converted into kinetic energy is smaller in the second embodiment than in the first embodiment.

Accordingly, when the running wheels 7 move from the rear receiving pieces N to the front receiving pieces M of the front wheel lowering guide rails 8A and the rear wheel lowering guide rails 8B, the sound caused by the collision of the running wheels 7 with the front receiving pieces M is smaller in the second embodiment than in the first embodiment.

In addition, in the second embodiment, the front wheel lowering guide rails 8A and the rear wheel lowering guide rails 8B are made from a synthetic resin, and the sound caused by the collision of the running wheels 7 with the front receiving pieces M is further smaller.

According to the configuration of the vertical circulating conveyor as described above, the transport vehicle 5 can be moved in the lowering path part 3 under the weight of the transport vehicle 5 in a powerless manner. This eliminates the need for a powered table raising and lowering lift device, a powered feeding device for feeding the transport vehicle 5 to the table raising and lowering lift device, a powered delivering device for delivering the transport vehicle 5 from the table raising and lowering lift device, unlike the case where the table raising and lowering lift device is used in the lowering path part 3. This contributes to energy saving and space saving and reduces manufacturing costs and maintenance costs.

In addition, since the transport vehicle 5 is not moved in the lowering path part 3 by raising and lowering the table by the table raising and lowering lift device, it is not necessary to temporarily fast-forward the transport vehicle 5 having exited the work path part 6 in the conveyance path part 1 at a high speed to keep a sufficient distance from the following transport vehicle 5 so as not to be overtaken by the following transport vehicle 5, and complete the operation of feeding the transport vehicle 5 to the table raising and lowering lift device, the operation of lowering the table raising and lowering lift device, the operation of delivering the transport vehicle 5 from the table raising and lowering lift device, and the operation of raising the table raising and lowering lift device before the feeding of the following transport vehicle 5 to the table raising and lowering lift device, unlike the case where the transport vehicle 5 is moved in the lowering path part 3 by the table raising and lowering lift device. Accordingly, it is not necessary to provide a long high-speed fast-forward section unlike in the case of the table raising and lowering lift device, which contributes to space saving.

Further, unlike the case where the transport vehicle 5 is moved in the lowering path part 3 by the table raising and lowering lift device, it is not necessary to lower the table in the raised position to the lowered position and then return the same to the raised position. The transport vehicles 5, 5, . . . can be continuously lowered, thereby shortening the conveyance cycle time.

Moreover, the vertical circulating conveyor has the section in which the transport vehicle 5 having fallen from the lowering path part 3 under its own weight coasts and moves in a powerless manner in the return path part 2. This makes it possible to decrease or eliminate the feeding devices for moving the transport vehicle 5 having entered in the return path part 2 to the downstream side of the return path part 2, thereby reducing manufacturing costs and maintenance costs.

REFERENCE SIGNS LIST

1 Conveyance path part
1A Upstream end portion
1B Downstream end portion
1R Guide rail
2 Return path part
2A Upstream end portion
2B Downstream end portion
2R Guide rail
3 Lowering path part
3R Lowering guide rail
4 Raising path part
5 Transport vehicle
6 Work path part
7 Running wheel
8A Front wheel lowering guide rail
8B Rear wheel lowering guide rail
8C Movable rail
9A Upper connection rail
9B Lower connection rail
10 Geared motor
10A Drive shaft
10B Driving sprocket
10C and 10D Driven sprocket
11A Front wheel raising arm
11B Rear wheel raising arm
12A Front wheel raising guide rail
12B Rear wheel raising guide rail
13 Support roller
14 Plate spring (elastic biasing means)
A Movement direction in conveyance path part
B1, B2, and B3 Brake roller (deceleration means)
C Drive device
D Transport vehicle line
E Bottom surface
F Front wheel
G Machine frame
H Horizontal support shaft
h0 Height-direction distance from position of wheels in the conveyance path part to the position of wheels in the return path part
h1 and h2 Height-direction distance from the position of wheels in the conveyance path part to the position of wheels where the front-back movement direction is reversed in the lowering path part
I1 Cutout
I2 Opening
J and K Roller chain
L1 Distance between right-left outer sides of front wheels
L2 Distance between right-left outer sides of rear wheels
L3 Distance between right and left cutouts (openings)
M Front receiving piece
N Rear receiving piece
R Rear wheel
T1 Constant-speed conveyance feeding device
T2 Brake feeding device
T3, T4, and T5 Feeding device

The invention claimed is:

1. A vertical circulating conveyor that moves a transport vehicle capable of loading an article along a vertical circulating path composed of a linear conveyance path part and a linear return path part positioned below the conveyance path part, a lowering path part that connects a downstream end portion of the conveyance path part and an upstream end portion of the return path part and a raising path part that connects a downstream end portion of the return path part and an upstream end portion of the conveyance path part, and has a work path part in the conveyance path part where a work is performed on the article, wherein
the lowering path part includes lowering guide rails to guide running wheels of the transport vehicle,
the transport vehicle is moved in the lowering path part by falling under its own weight in a powerless manner while the running wheels of the transport vehicle are guided by the lowering guide rails,
the vertical circulating conveyor has a section in which the transport vehicle having fallen under its own weight from the lowering path part coasts and moves in a powerless manner in the return path part,
wherein
while the transport vehicle is moving in the conveyance path part, a distance between right-left outer sides of front wheels as front-side right and left running wheels and a distance between right-left outer sides of rear wheels as rear-side right and left running wheels are changed in a direction of the movement,
the lowering guide rails are composed of right and left front wheel lowering guide rails in an arc shape in a right-left view to guide the front wheels and right and left rear wheel lowering guide rails in an arc shape in a right-left view to guide the rear wheels, and the transport vehicle is lowered in almost the horizontal state in the lowering path part while the front wheels are guided by the front wheel lowering guide rails and the rear wheels are guided by the rear wheel lowering guide rails.

2. The vertical circulating conveyor according to claim 1, wherein the transport vehicle is configured such that the distance between the right-left outer sides of the right and left rear wheels is smaller than the distance between the right-left outer sides of the right and left front wheels, the vertical circulating conveyor includes upper connection rails that extend between upper parts of the front wheel lowering guide rails and the rear wheel lowering guide rails to guide the front wheels, and lower connection rails that extend between lower parts of the front wheel lowering guide rails and the rear wheel lowering guide rails to guide the front wheels, cutouts or openings are formed in upper parts of the rear wheel lowering guide rails in the upper connection rails such that the rear wheels can move along the rear wheel lowering guide rails, and lower end portions of the rear wheel lowering guide rails are movable rails that are configured to be vertically swingable in such a manner as to be pushed away by the front wheels when the front wheels pass from the lower connection rails to the lower end portions of the rear wheel lowering guide rails, or the lower end portions of the rear wheel lowering guide rails are movable rails that are configured to be vertically swingable, are biased upward so as not to interfere with the front wheels when the front wheels pass from the lower connection rails to the lower end portions of the rear wheel lowering guide rails, and swing downward against the force of the biasing when the rear wheels pass.

3. The vertical circulating conveyor according to claim 1, wherein the return path part is provided with a deceleration means that decreases the speed of the transport vehicle entering from the lowering path part into the return path part and coasting there to a predetermined speed.

4. The vertical circulating conveyor according to claim 1, wherein the raising path part includes: right and left front wheel raising arms that are driven by a drive device to rotate in synchronization counterclockwise from left to right around a right-left axis and support and raise the right and left front wheels; right and left rear wheel raising arms that are driven by the drive device to rotate in synchronization counterclockwise from left to right around a right-left axis and support and raise the right and left rear wheels; right and left front wheel raising guide rails in an arc shape in a right-left view to guide an outer peripheral side of a movement path of the right and left front wheels supported by the front wheel raising arms; and right and left rear wheel raising guide rails in an arc shape in a right-left view to guide an outer peripheral side of a movement path of the right and left rear wheels supported by the rear wheel raising arms, and the transport vehicle is raised in almost the horizontal state in the raising path part while being guided by the front wheel raising guide rails and the rear wheel raising guide rails and being supported by the front wheel raising arms and the rear wheel raising arms.

5. The vertical circulating conveyor according to claim 1, wherein, immediately after unloading of the article on which work is completed at the work path part from the transport vehicle, the empty transport vehicle is lowered in the lowering path part.

6. The vertical circulating conveyor according to claim 1, wherein a transport vehicle line in which a plurality of transport vehicles is closely aligned in the front-back direction is conveyed in the work path part by a constant-speed feeding device provided at an entry of the work path part and a brake feeding device provided at an exit of the work path part.

7. A vertical circulating conveyor that moves a transport vehicle capable of loading an article along a vertical circulating path composed of a linear conveyance path part and a linear return path part positioned below the conveyance path part, a lowering path part that connects a downstream end portion of the conveyance path part and an upstream end portion of the return path part and a raising path part that connects a downstream end portion of the return path part and an upstream end portion of the conveyance path part, and has a work path part in the conveyance path part where a work is performed on the article, wherein the lowering path part includes lowering guide rails to guide running wheels of the transport vehicle, the transport vehicle is moved in the lowering path part by falling under its own weight in a powerless manner while the running wheels of the transport vehicle are guided by the lowering guide rails, the vertical circulating conveyor has a section in which the transport vehicle having fallen under its own weight from the lowering path part coasts and moves in a powerless manner in the return path part, wherein while the transport vehicle is moving in the conveyance path part, a distance between right-left outer sides of front wheels as front-side right and left running wheels and a distance between right-left outer sides of rear wheels as rear-side right and left running wheels are changed in a direction of the movement, the lowering guide rails are composed of right and left front wheel lowering guide rails to guide the front wheels and right and left rear wheel lowering guide rails to guide the rear wheels, a height-direction distance from the position of the running wheels in the conveyance path part to the position of the running wheels where a front-back movement direction is reversed is made smaller than half of a height-direction distance from the position of the running wheels in the conveyance path part to the position of the running wheels in the return path part, and the transport vehicle is lowered in almost the horizontal state in the lowering path part while the front wheels are guided by the front wheel lowering guide rails and the rear wheels are guided by the rear wheel lowering guide rails.

8. The vertical circulating conveyor according to claim 7, wherein the transport vehicle is configured such that the distance between the right-left outer sides of the right and left rear wheels is smaller than the distance between the right-left outer sides of the right and left front wheels, the vertical circulating conveyor includes upper connection rails that extend between upper parts of the front wheel lowering guide rails and the rear wheel lowering guide rails to guide the front wheels, and lower connection rails that extend between lower parts of the front wheel lowering guide rails and the rear wheel lowering guide rails to guide the front wheels, cutouts or openings are formed in upper parts of the rear wheel lowering guide rails in the upper connection rails such that the rear wheels can move along the rear wheel lowering guide rails, and lower end portions of the rear wheel lowering guide rails are movable rails that are configured to be vertically swingable in such a manner as to be pushed away by the front wheels when the front wheels pass from the lower connection rails to the lower end portions of the rear wheel lowering guide rails, or the lower end portions of the rear wheel lowering guide rails are movable rails that are configured to be vertically swingable, are biased upward so as not to interfere with the front wheels when the front wheels pass from the lower connection rails to the lower end portions of the rear wheel lowering guide rails, and swing downward against the force of the biasing when the rear wheels pass.

9. The vertical circulating conveyor according to claim 7, wherein the return path part is provided with a deceleration means that decreases the speed of the transport vehicle entering from the lowering path part into the return path part and coasting there to a predetermined speed.

10. The vertical circulating conveyor according to claim 7, wherein the raising path part includes: right and left front wheel raising arms that are driven by a drive device to rotate in synchronization counterclockwise from left to right around a right-left axis and support and raise the right and left front wheels; right and left rear wheel raising arms that are driven by the drive device to rotate in synchronization counterclockwise from left to right around a right-left axis and support and raise the right and left rear wheels; right and left front wheel raising guide rails in an arc shape in a right-left view to guide an outer peripheral side of a movement path of the right and left front wheels supported by the front wheel raising arms; and right and left rear wheel raising guide rails in an arc shape in a right-left view to guide an outer peripheral side of a movement path of the right and left rear wheels supported by the rear wheel raising arms, and the transport vehicle is raised in almost the horizontal state in the raising path part while being guided by the front wheel raising guide rails and the rear wheel raising guide rails and being supported by the front wheel raising arms and the rear wheel raising arms.

11. The vertical circulating conveyor according to claim 7, wherein, immediately after unloading of the article on which work is completed at the work path part from the transport vehicle, the empty transport vehicle is lowered in the lowering path part.

12. The vertical circulating conveyor according to claim 7, wherein a transport vehicle line in which a plurality of transport vehicles is closely aligned in the front-back direction is conveyed in the work path part by a constant-speed feeding device provided at an entry of the work path part and a brake feeding device provided at an exit of the work path part.

* * * * *